INVENTOR.
DAVID L. LAFUZE
BY W. J. Shanley Jr.
HIS ATTORNEY

Sept. 3, 1968     D. L. LAFUZE     3,400,321
PROTECTIVE CIRCUITS FOR FREQUENCY CONVERTER SYSTEM
Filed Sept. 13, 1965     5 Sheets-Sheet 2

INVENTOR.
DAVID L. LAFUZE
BY W. J. Shanley, Jr.
HIS ATTORNEY

INVENTOR.
DAVID L. LAFUZE

Sept. 3, 1968 D. L. LAFUZE 3,400,321
PROTECTIVE CIRCUITS FOR FREQUENCY CONVERTER SYSTEM
Filed Sept. 13, 1965 5 Sheets-Sheet 5
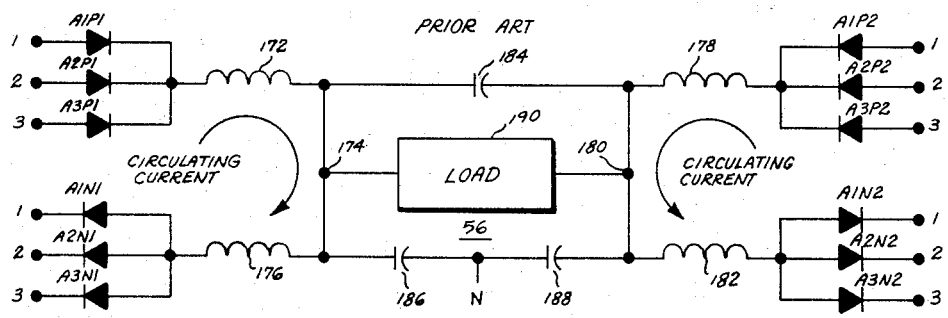
FIG. 6(a)
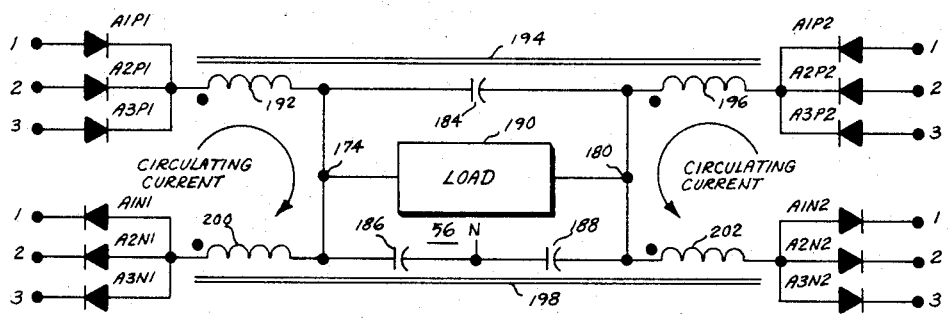
FIG. 6(b)
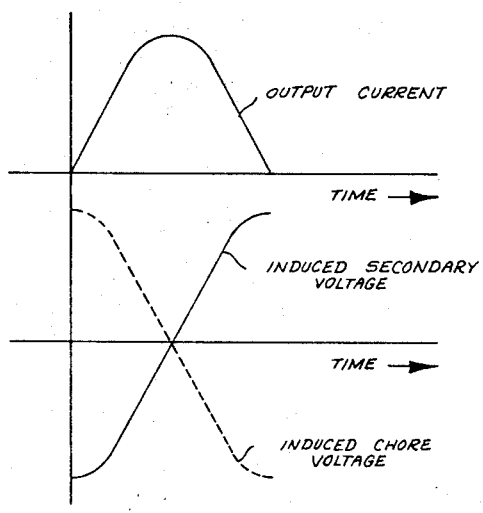
FIG. 7(a)
FIG. 7(b)
INVENTOR.
DAVID L. LAFUZE
BY *W. J. Shanley Jr.*
HIS ATTORNEY

United States Patent Office 3,400,321
Patented Sept. 3, 1968

3,400,321
PROTECTIVE CIRCUITS FOR FREQUENCY
CONVERTER SYSTEM
David L. Lafuze, Waynesboro, Va., assignor to General
Electric Company, a corporation of New York
Filed Sept. 13, 1965, Ser. No. 486,670
34 Claims. (Cl. 321—60)

ABSTRACT OF THE DISCLOSURE

Protective circuits for a frequency converter of the cyclo-converter type are required to insure controlled and component-safe operation. These protective circuits include a blanking circuit to permit firing of the controlled rectifiers only when the controlled rectifiers are forward biased; a current limit circuit which distinguishes between acceptably large currents and prohibitively large currents; a gradual startup circuit which limits the likelihood of commutation failure at startup; and a current squelch circuit to inhibit circulating currents in the system filters.

Background of the invention

This invention relates to frequency converter systems. More particularly, it relates to systems for providing a low frequency output from electrical energy supplied at a higher frequency.

The system of this invention may be used to provide an output having a constant frequency over a chosen range of determinate frequencies when supplied by a variable speed source such as an engine. For example, such systems are used in aircraft applications where a variable speed aircraft engine is used to provide power for an electric generator. Alternatively, the system of this invention is useful in A-C motor speed control where it is desired to vary the frequency of the A-C power supplied to the motor to proportionately vary the speed of the motor.

This system is of the type which generates an output voltage wave by adding up segments of input voltage waves derived from a chosen plurality of balanced phase power source outputs. The system itself comprises a frequency conversion means for each of a desired number of output phases. Each of the conversion means includes at least the chosen plurality of first and second controlled rectifiers inversely connected between a source of input voltage waves and a system load. The desired number of modulators are connected in circuit with the power source and the frequency conversion means to program the firing of the controlled rectifiers. These modulators select the segments of the voltage waves to be added by turning on the controlled rectifiers at various phase angles of the source voltages. Thus, a required average voltage is selected from each cycle of the input voltage wave and is added to an average voltage selected from the other input voltage waves. The summation of these voltages comprises the output voltage wave. For example, if a sine wave output is desired, at the peak of the sine wave a controlled rectifier is programmed to conduct early in a corresponding cycle of the input voltage wave. This provides a relatively large average voltage for this point in the sine wave. As the magnitude of the output voltage wave decreases, the controlled rectifiers are turned on later in the corresponding cycle of the input voltage waves. The average voltage derived therefrom decreases accordingly.

The output current is transferred from one controlled rectifier to another by a process called commutation. Malfunctions in frequency conversion systems of this type have occurred during the firing and commutation periods of a system as explained below.

In many applications of frequency conversion systems the input power source comprises a polyphase source such as a three-phase electrical generator. Each controlled rectifier is connected from a power line to the load. When another rectifier connected to the load is conducting, the voltage applied to the first rectifier is the voltage from its generaor line to the generator line of the conducting rectifier. When the line-to-line voltage forward biases a controlled rectifier and a modulating circuit provides gate current therefor, the controlled rectifier conducts a segment of the output current. The disadvantages of a firing pulse when the controlled rectifier is reverse biased are first that the leakage current in the rectifier is considerably increased causing heating of the controlled rectifier. Second, a pulse transformer, often used to couple pulses to the controlled rectifier, may not be fully reset when the proper firing time comes and thus an adequate firing pulse may not be delivered to the controlled rectifier.

Therefore, it is an object of this invention to provide a frequency converter system wherein a firing pulse cannot be supplied to the controlled rectifier when the controlled rectifier is reverse biased.

In any system for supplying electrical energy to a load device it is important to monitor the amount of power delivered to the load. If the load should short circuit the energy supplying device, the current supplied by the device greatly increases until the power capabilities of the device are surpassed and a malfunction occurs. Furthermore, energy supplying systems must protect against internal failures which might increase the internal current flow of a system beyond a safe amount. Where a number of controlled rectifiers supply the current paths for the output current of a system, as in the subject frequency converter, commutation of the controlled rectifiers occurs as the voltage across each of the rectifiers varies. Thus, the current flow through each controlled rectifier is periodically terminated and restarted so that the modulating circuits can control the amount of power delivered by each controlled rectifier. However, there may be a failure to switch the current from a first controlled rectifier to a second when the second is fired. A large current then circulates between the controlled rectifiers instead of flowing through the load. When this commutation failure occurs it can cause the destruction of various circuit components due to the high current flow. Since the current does not flow through the load it cannot be detected by circuits which control the load current.

It is another object of this invention to provide frequency converter systems which are compensated for high current causing malfunctions.

In frequency converter systems of the type described, the firing of the controlled rectifiers is programmed by means of modulators. Each of these modulators fires a corresponding controlled rectifier whenever a reference voltage forward biases the modulator. When a frequency converter or any device of this type for supplying power by means of controlled rectifiers is required to supply a large increase in power over a short time, it tends to fire all the controlled rectifiers at the same time, which causes it to fail. For example, at start up of the frequency converter or after a short circuit has been corrected, the output of the frequency converter is at a low level. The biasing voltage at the modulators tends to fire all the controlled rectifiers at the same time to bring the output to its steady state energy level. Normal corrective measures such as feedback are ineffective since the system has little or no output voltage required for their operation. Thus, a commutation failure can occur.

It is a further object of this invention to provide means for preventing the malfunction of a power supplying system when the system is increasing its output.

In some applications of a frequency converter system of the type described above a filter circuit used in conjunction with various loads contributes to the possibility of commuation failure. For example, each ouput phase of a frequency converter of the double-way type contains a double set of first and second rectifiers for each input phase. When a set of controlled rectifiers is forward biased by the line-to-line voltage, current flows through a first controlled rectifier, through the load, and then through a second controlled rectifier. When the line-to-line voltage reverses in polarity, current can flow through the second set of controlled rectifiers and through the load in the opposite direction. The use of two rectifiers connected to each input phase in opposite polarity at one side of the load provides a path through which circulating current may pass without passing through the load. If this circulating current flow is large enough it may prevent the controlled rectifiers from turning off. This causes a commutation failure of the controlled rectifiers. The problem is increased when the filter used with the frequency converter includes a number of inductive members. The chances of commutation failure are greatest at the end of one half cycle of an output current wave when the controlled rectifiers are about to change their state of conduction. Since the current flow through the controlled rectifiers, the load and the filter is decreasing at this time, this current induces a voltage in the filter inductors which tends to maintain the flow of current. Therefore, the inductors tend to increase the flow of circulating current at a time when a smaller circulating current is desired for proper circuit operation. Some prior art circuits have limited the flow of circulating current by back biasing the rectifiers at each side of the load. However, this back bias provides an offset in the voltage characteristic of the output voltage wave which distorts the wave shape in proportion to the back bias. If the bias voltage must be large to prevent commutation failure, it is difficult to obtain a smooth output voltage wave.

It is still another object of this invention to provide a frequency converter system which nullifies the effects of inductive circuit members on the commutation of controlled rectifiers.

It is a general object of this invention to provide a frequency converter system in which improved performance obtains by obviating the malfunction of controller rectifiers.

Summary of the invention

Briefly stated, and in accordance with one aspect of this invention, a frequency converter system includes a desired number of frequency conversion means which provide a desired number of output phases from a chosen plurality of power source outputs. Circuit means, responsive to the current flow from the power source, both regulate the output voltage of the frequency conversion means in accordance with a predetermined change in current flow from the power source and momentarily decrease this output voltage in response to an inordinate change in the current flow from the power source. The desired number of modulating means mix the power source output voltage with a reference voltage from a reference voltage source to program the firing of the chosen plurality of first and second controlled rectifiers. Means are provided for interrupting operating power to portions of the modulating means when corresponding controlled rectifiers are reverse biased. The reference voltage source includes means for gradually increasing the reference voltage to its steady state value after an interruption in power supplied by the power source. The desired number of combining means combine the outputs of the controlled rectifiers in each of the conversion means to provide the desired number of output phases. Where the load current flows through the load in more than one direction and the combining means includes a plurality of inductors, means are also provided for interconnecting pairs of inductors to neutralize the effects of induced inductors voltage on current which circulates between the first and second controlled rectifiers without flowing through the load.

Brief description of the drawings

FIGURE 6 shows a filter circuit used in a frequency converter system; and

FIGURE 7 is a voltage wave diagram used to explain the operation of the filter circuit shown in FIGURE 6.

Description of the invention

The general operation of a frequency control system constructed in accordance with this invention is explained with reference to FIGURE 1. Thereafter, the specific operation and configuration of various portions of this system which helps to guard against malfunction of the controlled rectifiers in the converters is specifically described.

Figure 1:
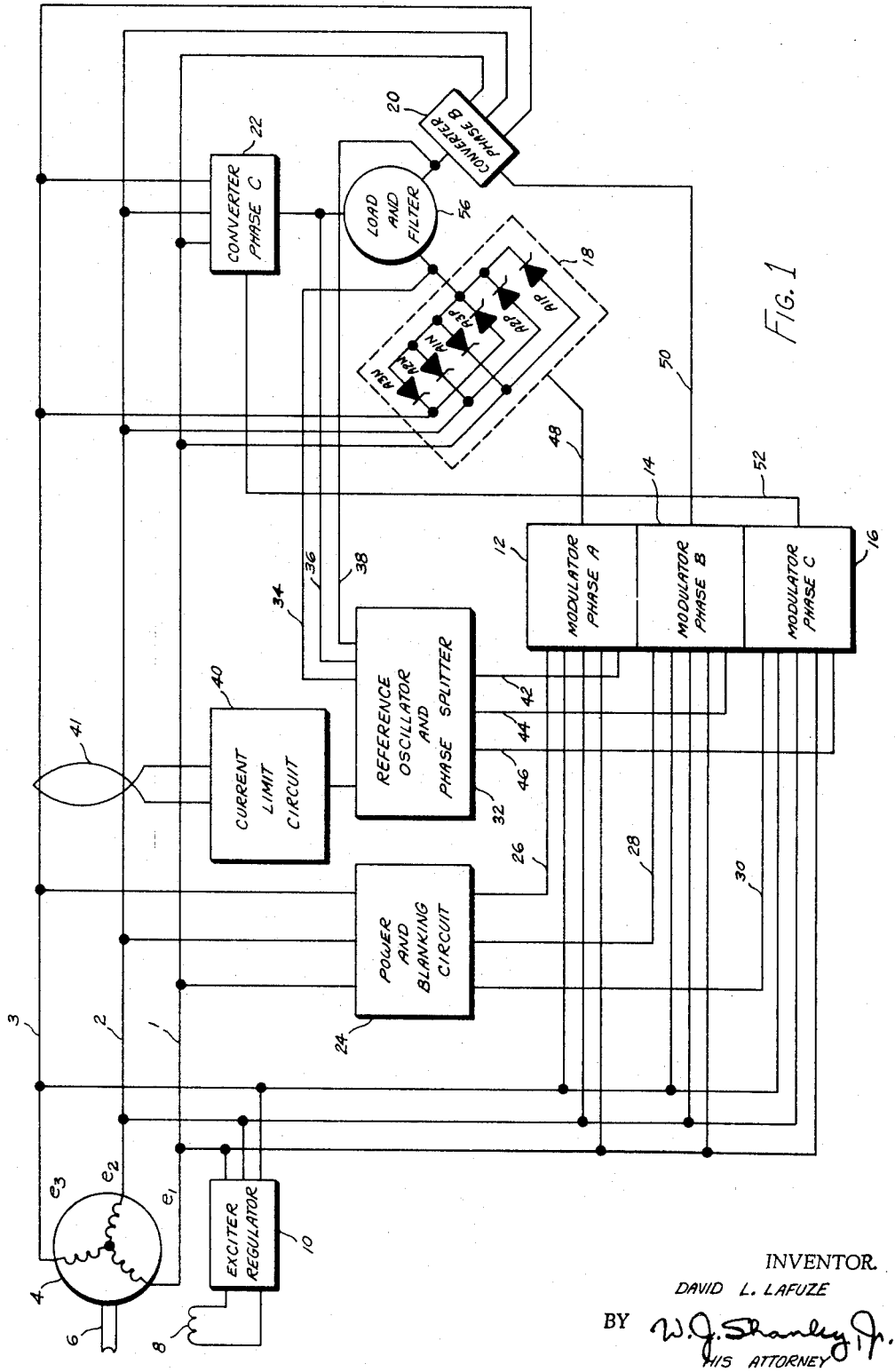
FIGURE 1 is a block diagram of a frequency converter system constructed in accordance with this invention.

Referring to FIGURE 1, a power source 4 is shown for providing a plurality of balanced phase, power source outputs, viz. phases $e1$, $e2$ and $e3$. Where the power source is an electrical generator of the wound rotor type, it may rotate through a shaft 6. The frequency of the output voltage varies in accordance with the speed of the shaft 6 so that a variable speed prime mover connected to the shaft 6 provides a variable frequency output at power source output phase lines 1, 2 and 3. A field winding 8 of the generator 4 is energized by an exciter 10 which may be of the static type. A feedback voltage is derived from the output lines 1, 2 and 3 and is coupled to the exciter 10 which contains a voltage regulator for the output of the generator 4.

The combination of a frequency converter and a modulator is instrumental in providing an output voltage wave for each of a desired number of output phases. Frequency converter systems of this type may provide a variety of desired numbers of output phases from any chosen plurality of balanced phase power source outputs. Thus, for example, three-phase output systems are provided from six-phase power sources, and single-phase output systems are provided from three-phase input systems.

In the preferred embodiment three outputs equally displaced in phase, viz. phases A, B and C, are provided from the three-phase power source or generator 4. Modulators 12, 14 and 16 program the output from the frequency conversion means comprising converters 18, 20 and 22, respectively, so as to construct output voltage waves for output phases A, B and C, respectively. The modulators 12, 14 and 16 are connected between the power source output lines 1, 2 and 3, and their respective converters. A power and blanking circuit 24 provides power for each of the modulators through the buses 26, 28 and 30. Further, the power and blanking circuit 24 provides means for cutting off the power to any portion of a modulator when a power switching device to be controlled thereby is reversed biased by a line-to-line voltage from the generator 4.

A reference oscillator and phase splitter 32 provides a reference voltage of the frequency and wave shape desired for each phase of the system output voltage. A feedback voltage is provided through lines 34, 36 and 38 to a voltage regulator within the reference oscillator 32 which controls the magnitude of the generated reference voltages. Since the magnitude of the system output voltage varies with the magnitude of the reference voltage, the system output voltage is regulated as well. A current limit circuit 40 is provided with means 41 for sensing the current flow through the generator output lines. It regulates the output of the converters 18, 20 and 22 in accordance with the current flow through the generator lines 1–3. The current limit circuit 40 is interconnected with the voltage regulator circuits in the reference oscillator 32. The circuit 40 causes current regulation to occur in place of the voltage regulation function, should the current rise above a permissible limit. The current limit circuit can both momentarily decrease the output of the converter circuits in response to a sudden increase in the current from the generator 4 and regulate the steady state output of the converters 18, 20 and 22 in response to changes in that current flow.

In the voltage regulator for the reference oscillator 32, a normally constant reference voltage is replaced with a ramp-shaped voltage after the output of the frequency converter system has terminated for any reason. This allows the modulators 12, 14 and 16 to program the system output voltage in a normal manner, in spite of the transient voltage conditions caused by starting the system.

The voltages from the reference oscillator 32 are coupled through the lines 42, 44 and 46 to the modulators 12, 14 and 16, respectively. In the modulators the reference voltage wave is mixed with the negative cosine of the line-to-line voltage across individual power switching devices in the converters 18, 20 and 22. Each of the modulators provides modulating means for each of the power switching devices in its corresponding converter. When the magnitude of the voltage from the reference oscillator at a modulating means is greater than the cosine of the line-to-line voltage across a corresponding power switching device, the reference voltage causes the modulating means to supply a firing current pulse for the power switching device.

Each of the converters basically comprises a plurality of first and second power switching devices such as the controlled rectifiers shown in the converter 18. The anode of each of the first controlled rectifiers is respectively coupled to one of the generator output lines to provide output current when this line is of positive polarity. These controlled rectifiers may be referred to as a positive bank of rectifiers. The controlled rectifiers themselves are marked A1P, A2P, A3P, B1P, etc. in accordance with a code which designates how each controlled rectifier is connected in the system. The first letter (A, B, C) stands for the system output phase in which the controlled rectifier is connected, the number (1, 2, 3) stands for the line to which it anode is connected, and the P signifies that it is in a positive controlled rectifier bank. As illustrated in the converter 18 for phase A of the system output voltage, the controlled rectifier marked A1P is the rectifier in phase A which has its anode connected to generator output line 1 in the positive bank of controlled rectifiers.

The cathode of each of the second controlled rectifiers is respectively coupled to one of the generator output lines so that these rectifiers carry output current when the voltage at the lines is negative in polarity. These controlled rectifiers may be referred to as a negative bank of rectifiers. These rectifiers are marked A1N, A2N, A3N, B1N, etc., in accordance with the code described above, except that the number in the middle (1, 2, 3) signifies the line to which the cathode of a controlled rectifier is connected and the N denotes that this controlled rectifier is in the negative bank of rectifiers.

Load and filter means 56 are connected to lines running from the output phases A, B and C. For some types of loads, as for example electrical motors, it is unnecessary to provide filtering. However, for many other types of loads a filter has been found desirable. When a filter is necessary for some frequency converter configurations, it has been found that magnetically coupled filter coils minimize commutation problems that often arise.

Figure 3:
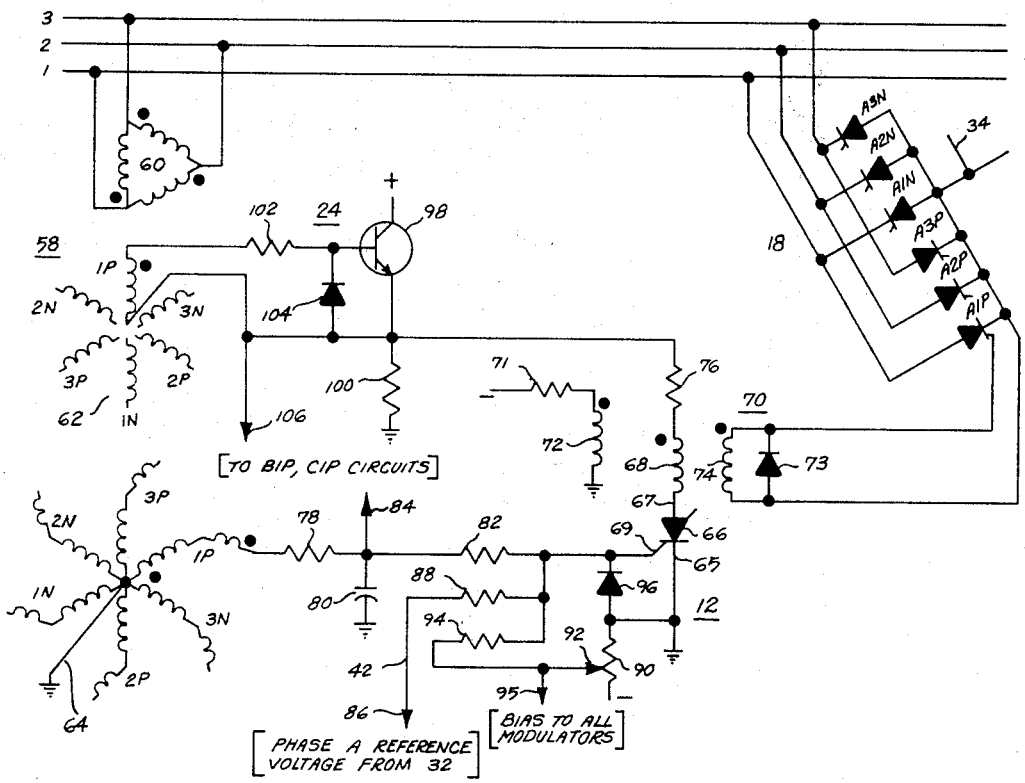
FIGURE 3 is a schematic diagram showing a portion of a frequency converter system built in accordance with this invention.

FIGURE 3 is referred to for a more detailed explanation of the operation of a portion of the frequency converter system shown in FIGURE 1. Basically, FIGURE 3 shows the portion of the power and blanking circuit 24 and the portion of the modulator 12 which are used to provide firing pulses to the controlled rectifier A1P in the converter 18. Circuit means are provided for coupling signals indicative of the voltage levels across the various controlled rectifiers within the converters 18, 20 and 22 to circuits within the power and blanking circuit 24 and within the modulators 12, 14 and 16. Thus, a transformer system 58 is provided having primary windings 60 connected across the generator output lines 1, 2 and 3. Secondary windings 62 are included within the power and blanking circuit 24 and a secondary winding 64 is included in the modulators 12, 14 and 16. The individual coils of the secondary windings are drawn parallel to the primary winding to which they are magnetically coupled. The individual secondary windings of the transformer are numbered 1P, 2P, etc. This designates the controlled rectifier in each output phase which is controlled through signals provided by the coil. For example, referring to the secondary winding 62, the winding 1P receives a voltage in phase with that induced in the primary winding connected across the generator output lines 1 and 3. This winding 1P is connected in the power and blanking circuit for the controlled rectifier A1P in the converter 18. The winding marked 1P in the secondary winding 64 has a voltage which is a combination of the voltage induced in the primary windings connected across the generator output lines 1 and 2 and lines 2 and 3. This winding is connected in the modulator circuit for the controlled rectifier marked A1P in the converter 18.

The modulating means within the modulator 12 include a silicon controlled switch (SCS) 66 connected between ground and a control winding 68 of a pulse transformer 70, having a bias winding 72 and a gate winding 74. The SCS 66 has a cathode electrode 65, an anode electrode 67, and a cathode-gate electrode 69. The control winding 68 is connected through a resistor 76 to a portion of the power and blanking circuit 24. The modulating circuit for the controlled rectifier A1P further includes a circuit connected to the gate electrode 69 of the SCS 66 for programming the firing of the SCS 66. A voltage equal to the negative cosine of the line-to-line voltage applied across the controlled rectifier A1P is developed by the winding 1P in the secondary windings 64. A resistor 78, a capacitor 80, and a resistor 82 couple this negative cosine to the cathode gate electrode of the SCS 66. A terminal 84 couples the voltage at the junction of the resistor 78 and the capacitor 80 to the B1P and the C1P modulating circuit means in the modulators 14 and 16.

In the pulse transformer 70 a negative bias potential is coupled through a resistor 71 to the bias winding 72 to reset the pulse transformer 70. A diode 73 is connected across the gate winding 74 to protect the gate-cathode junction of the controlled rectifier A1P from damage which may be caused by a reverse bias.

A reference voltage wave, coupled from the reference oscillator 32 (see FIGURE 1), is applied through a terminal 86 and a resistor 88 to the gate electrode 69 of the SCS 66. A negative voltage supply provides a D-C bias through a portion of a potentiometer 90, a slide wire 92, and a resistor 94 to the cathode gate of the SCS 66. A terminal 95 connects this D-C bias to all the modulating circuits. A diode 96 protects the gate-cathode junction of the SCS 66 from damage which might be caused by a reverse bias.

In the portion of the power and blanking circuit 24 shown in FIGURE 3, a power transistor 98 is connected between a source of positive potential and the modulating circuit for the controlled rectifier A1P. A resistor 100 is connected between the emitter electrode of the transistor 98 and ground. A voltage in phase with the line-to-line voltage across the controlled rectifier A1P is developed across the winding 1P of the secondary windings 62. This voltage is coupled through a resistor 102 to the base-emitter junction of the transistor 98. A diode 104 shorts the base and emitter electrodes of the transistor 98 when they are reverse biased. The voltage at the winding 1P of the secondary winding 62 is coupled through a terminal 106 to the emitter of a similar power transistor in the B1P and C1P circuits in the power and blanking circuit 24.

In general, the subject frequency converter system is of the type which builds up its output voltage waves by adding up segments of the input voltage waves from the lines 1, 2 and 3. These bits of the input voltage waves are selected by turning on the controlled rectifiers in the converters 18, 20 and 22 at different phase angles of the input voltage waves. The required average voltage is added to construct a separate voltage wave in each converter. At the peak of the output voltage wave the controlled rectifiers are turned on earliest in the input voltage cycles. Thereafter the controlled rectifiers are turned on later in the voltage cycle, if a sinusoidal output wave is being generated. In order to accurately construct an output voltage wave, there should be many voltage waves so that the appropriate voltage can be selected at any instant without having to average over a long period. The input frequency therefore should be considerably higher than the output frequency. Increasing the number of input phases is about as effective for accurately constructing an output voltage wave as increasing the input frequency, but utilization of the individual controlled rectifiers is decreased since their conduction interval while constructing an output voltage wave is inversely proportional to the number of phases used in the construction.

Both polarities of output voltages are required. For this reason the two sets of phase controlled rectifiers are connected back-to-back in each of the converters. These controlled rectifiers are programmed by the modulators 12, 14 and 16 to generate the desired output voltage wave shape at the desired frequency. While each set of controlled rectifiers permits current to flow only in one direction, this current may be caused either by the power source or by a load. When the power flows toward the load, the system operates in a rectifying mode, and the average source voltage causes current to flow through the rectifier in its conducting direction. When power flows back toward the source, as it will during part of a cycle with a reactive load, the system operates in an inverting mode. The average voltage of the power source opposes current flow in the conducting direction. The desired output voltage must be programmed on both sets of controlled rectifiers. The direction of current flow at any instant is determined by the load.

Figure 2A:
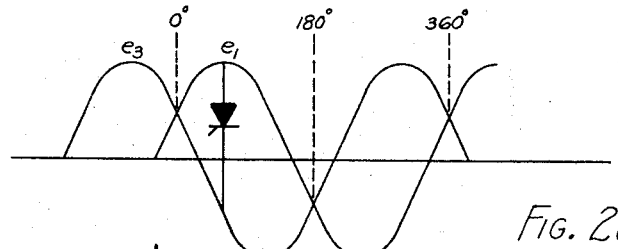
FIGURE 2 is a voltage wave diagram used to explain the operation of a portion of a frequency converter system built in accordance with this invention.

FIGURE 2 is referred to for a more detailed explanation of the operation of the portion of the frequency converter system shown in FIGURE 3. FIGURE 2(a) shows a voltage diagram of the line-to-line voltage developed across the controlled rectifier A1P during the operation of the system. This is the voltage developed across the winding 1P of the winding 62. For any controlled rectifier this comprises the voltage between the line to which it is directly connected and the line to which the last-fired controlled rectifier is directly connected. For the controlled rectifier A1P this is the voltage between lines 1 and 3. Starting from the portion of the diagram marked zero degrees, it is seen that the line-to-line voltage forward biases the controlled rectifier A1P through one-half of a cycle of the voltage, to a point marked 180°. For the remaining one-half of the voltage wave cycle, to a point marked 360°, the controlled rectifier A1P is reverse biased.

Figure 2B:
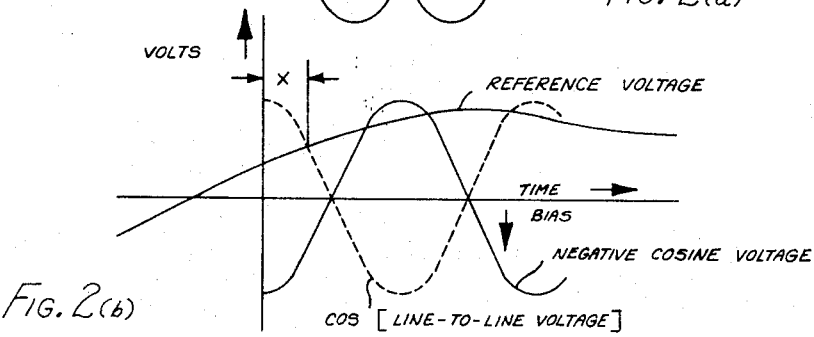

FIGURE 2(b) shows a voltage diagram of the three voltage waves that are mixed at the gate electrode 69 in the modulating circuit for the controlled rectifier A1P. However, for illustrative purposes the voltage developed by the winding 1P of the secondary windings 64 is also shown in a dotted wave form as a positive cosine of the line-to-line voltage. The negative cosine function actually developed at the winding 1P is shown as a solid voltage curve. A solid line voltage wave represents the reference voltage. This reference voltage equals the magnitude of the dotted line cosine voltage wave at a firing angle X between zero and 180° of the line-to-line wave.

The operation of the circuit shown in FIGURE 3 will be explained with respect to a cycle of the line-to-line voltage applied across the controlled rectifier A1P. The controlled rectifier A3P has been carrying the load current prior to the time when A1P is fired. A1P carries the load current after it is fired until the controlled rectifier A2P is subsequently fired.

The generator 4 generates a three-phase output voltage across the output lines 1, 2 and 3. A portion of each cycle of the output voltage from each of the three output phases $e1$, $e2$ and $e3$ is applied to the load and filter 56 by each of the controlled rectifiers in the converter for each output phase A, B and C. Referring to FIGURE 3, each of the controlled rectifiers in the converter 18 can be fired when the line-to-line voltage applied thereacross forward biases it. The firing angle at which each of the controlled rectifiers is fired depends upon how a modulating circuit for the controlled rectifier programs its firing.

To provide a firing pulse through the pulse transformer 70 to the controlled rectifier A1P, both the transistor 98 and the SCS 66 must be conducting. With regard to the transistor 98, when the voltage at output line 1 is positive in polarity with respect to that at output line 3, this polarity of voltage is induced from the primary winding 60 across the lines 1 and 3 to the secondary winding 1P in the secondary windings 62. The dot notation on these windings shows that the voltage induced in the winding 1P in 62 forward biases the transistor 98 as long as the voltage at line 1 remains positive in polarity with respect to that at line 3. During this time the power transistor 98 conducts to apply the positive potential at its collector elecrode to the control winding 68 of the pulse transformer 70 and the anode electrode 67 of the SCS 66. At the same time the negative cosine of the line-to-line voltage across lines 1 and 3 is applied from the winding 1P in the secondary winding 64 through the resistors 78 and 82 to the gate electrode 69. The reference voltage for the phase A converter 18 is coupled from the reference oscillator and phase splitter 32 and through the line 42, see FIGURE 1, the terminal 86 and the resistor 88 to the gate electrode 69. A bias voltage is coupled from the slide wire 92 and through the resistor 94 to the gate electrode 69.

The negative bias applied through the slide wire 92 of the potentiometer 90 effectively causes the negative cosine voltage wave to move downwardly in FIGURE 2(b) in proportion to the magnitude of the bias. The magnitude of the reference voltage must be greater to offset the negative cosine voltage and the negative bias voltage as the bias voltage becomes more negative. This occurs later in each cycle as the bias voltage becomes more negative. Therefore, the firing angle X of the SCS 66 becomes greater. By decreasing the bias voltage the reference voltage can overcome the negative cosine voltage and the bias voltage earlier in the cycle, thereby decreasing the firing angle X. It is possible to vary the firing angle, and thus the portion of each voltage cycle during which a controlled rectifier conducts, by varying the bias voltage.

The bias voltage is mixed with the reference voltage and the negative cosine voltage at the gate electrode 69, as shown in FIGURE 2(b). Where the sum of the instantaneous values of these three voltages is a negative voltage, it causes the diode 96 to ground the gate electrode 69 so that the SCS 66 does not fire. Therefore, there is no gate current to fire the controlled rectifier A1P, even though the transistor 98 has allowed a positive voltage at the anode electrode 67. When the instantaneous values of the negative cosine voltage, the reference voltage and the bias voltage add up to a positive voltage, the diode 96 is reverse biased and the SCS 66 is fired. Current flows from the positive voltage source through the transistor 98, the resistor 76, and the control winding 68 to induce a positive potential at the dot end of the control winding 68. This positive potential is induced at the dot end of the gate winding 74 where it reverse biases the diode 73. Therefore, gate current flows through the controlled rectifier A1P to fire it. The controlled rectifier A1P now carries the load current for the converter 18 until the controlled rectifier A2P is fired by its modulating circuit in the same manner when the voltage across the output lines 1 and 2 forward biases it.

When the voltage across the output lines 1 and 3 reverse biases the controlled rectifier A1P, at the point marked 180°, in FIGURE 2(a), the voltage at the dot end of the winding 1P in the secondary windings 62 becomes negative in polarity. This voltage forward biases the diode 104, causing it to short out the base and emitter electrodes of the transistor 98. The transistor 98 stops conducting so as to block the positive potential from the control winding 68 and the anode 67 of the SCS 66. Therefore, the SCS 66 cannot begin conducting to generate a firing pulse for the controlled rectifier A1P in the pulse transformer 70, even if a positive voltage appears at the gate electrode 69. During the period between 180° and 360° in FIGURE 2(a) the base and emitter of the transistor 98 are reverse biased by the voltage across the winding 1P so that no firing pulse can be generated in this interval.

When the SCS 66 is not conducting, the negative voltage at one end of the resistor 71 causes current to flow through the bias winding 72 to reset the pulse transformer 70.

Figure 4:
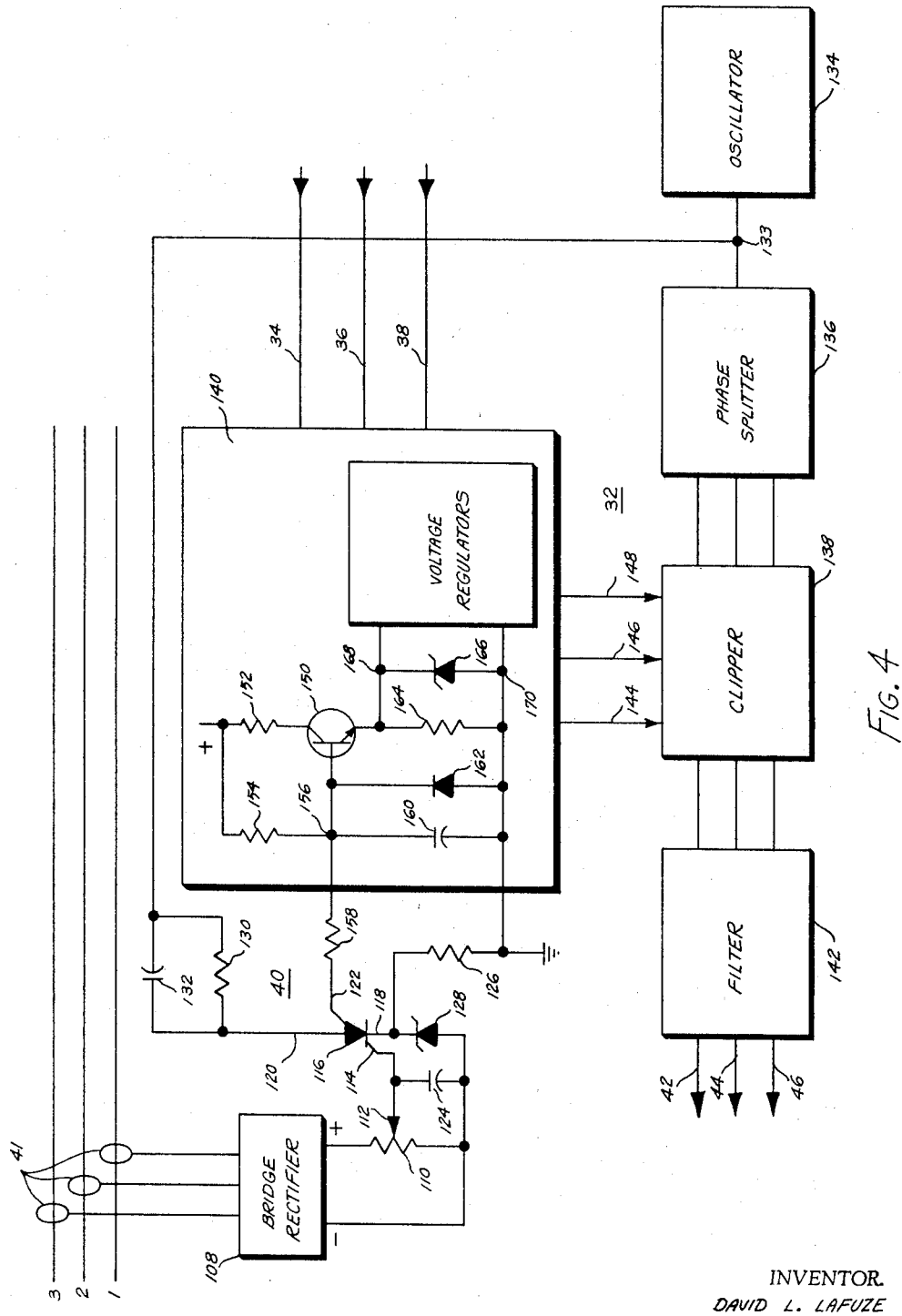
FIGURE 4 is a schematic diagram of current limiting and reference oscillator circuits which are incorporated into a frequency converter system.

FIGURE 4 is a schematic diagram of portions of the reference oscillator and phase splitter 32 and the current limit circuit 40 built in accordance with this invention. Their operation will be discussed with special emphasis on the circuit components which prevent commutation failure. The current limit circuit 40 itself regulates the output of the frequency converter after an inordinate increase in current flow from the generator 4. The circuit 40 also momentarily decreases the output of the frequency converter by a substantial amount in response to a predetermined increase in the current flow from the generator 4.

The current sensing means 41 may be transformers which couple voltage from the generator output lines 1, 2 and 3 to a bridge rectifier 108 in the current limit circuit 40. The bridge rectifier 108 converts the A-C voltage at the transformers to a proportional D-C voltage. The polarity of the output voltage at the terminals of the bridge rectifier 108 is marked on the diagram. The positive voltage terminal of the bridge 108 is coupled through a portion of a potentiometer 110 and its slide wire 112 to the cathode-gate electrode 114 of an SCS 116. The SCS 116 has a cathode electrode 118, an anode electrode 120, and an anode-gate electrode 122. A capacitor 124 integrates the voltage coupled across the slide wire 112 and the negative voltage terminal of the bridge rectifier 108. The cathode 118 is grounded through a resistor 126. A Zener diode 128 is connected between the negative voltage terminal of the bridge rectifier 108 and the cathode 118 to maintain a reference voltage level for firing the SCS 116.

A parallel RC circuit comprising a resistor 130 and a capacitor 132 interconnects the anode 120 with an output line 133 of an oscillator 134, shown as a portion of the reference oscillator and phase splitter 32. The oscillator 134 may comprise a square wave generator such as a free running multivibrator. The remaining portions of the reference oscillator and phase splitter 32 include a digital phase splitter 136, a clipper circuit 138, a voltage regulator circuit 140, and a filter circuit 142. A feedback voltage from the output of the converters 18, 20 and 22 is fed through the feedback lines 34, 36 and 38, respectively, to the voltage regulator circuit 140. The output from the regulator is coupled through the lines 144, 146 and 148 to the clipper circuit 138. The output from the filter circuit 142 is coupled through the lines 42, 44 and 46 to the modulators for each of the output phases of the frequency converter.

The voltage regulator circuit 140 includes a separate voltage regulator for each output phase of the frequency converter. The output of each of the voltage regulators is coupled through the lines 144, 146 and 148 to the clipper circuit 138 to control the magnitude of the voltage for each of the reference phases developed by the phase splitter 136. These voltage regulators may be any of the type well known in the art and are thus not specifically described in this specification.

The voltage regulator circuit 140 also includes a circuit for converting the voltage regulator circuit to a current regulator circuit when the current limit circuit 40 senses a high current flow through the lines 1, 2 and 3. This circuit includes a transistor 150 having its collector electrode connected through a resistor 152 to a source of positive voltage. A resistor 154 interconnects the source of positive voltage with a terminal 156 at the base electrode of the transistor 150. A resistor 158 interconnects the anode-gate electrode 122 with the terminal 156. A capacitor 160 is connected between the terminal 156 and ground to maintain a bias across the base and emitter electrodes of the transistor 150. A diode 162 grounds the terminal 156 when a negative potential is applied between it and ground. A resistor 164 and a Zener diode 166 are connected between the emitter electrode of the transistor 150 and ground. When the transistor 150 is conducting fully the Zener diode maintains a constant reference voltage across the pair of reference terminals 168 and 170 for the three voltage regulator circuits in the voltage regulator circuit 140. When the transistor 150 is conducting to a lesser extent, a smaller voltage is developed across the resistor 164 as will be more fully explained below.

With respect to the operation of the circuit shown in FIGURE 4, it should be remembered that the magnitude of the reference voltage which is mixed with the negative cosine voltage and the negative bias voltage in each modulator circuit determines the magnitude of the firing angle X for each controlled rectifier. To fire a controlled rectifier earlier in a cycle of its line-to-line voltage the reference voltage must overcome the negative voltages earlier in this cycle. When this occurs the controlled rectifier supplies more power to the frequency converter load. To decrease the power applied to the load, the reference voltage should be made smaller so that it surpasses the sum of the two negative voltages later in the half cycle. The controlled rectifier then conducts for a lesser portion of the cycle when it is forward biased and so delivers less power to the load. The circuit shown in FIGURE 4 determines the size of the reference voltage.

Referring to the block diagram of the reference oscillator and phase splitter 32 in FIGURE 4, the oscillator 134 generates its square wave output signal which the phase splitter 136 converts to a three-phase, balanced output signal. This signal is coupled to the clipper circuit 138 which determines the size of each of the phase voltages in response to the output of the voltage regulator circuit 140. Each of the voltage regulators in the voltage regulator circuit 140 compares a feedback signal from one of the lines 34, 36 and 38 with the voltage across the reference terminals 168 and 170 as a basis for its output signal. The output from the clipper circuit 138 is fed to a filter circuit 142 which shapes the reference voltage. The output from the filter circuit has the voltage wave shape and the frequency of the output voltage from the frequency converter system. Therefore, when a sine wave output voltage is desired, the filter circuit converts the square wave voltages at each phase to a sine wave voltage. The output from the filter circuit 142 is coupled through the lines 42, 44 and 46 to the modulators 12, 14 and 16, respectively.

The oscillator 134 may be a constant frequency oscillator, or a variable frequency oscillator, depending upon the use which is made of the frequency converter system. In the case where the generator 4 is driven by a variable speed engine attached to the shaft 6, see FIGURE 1, the frequency converter may comprise a constant frequency source by making the oscillator 134 a constant frequency oscillator. However, as in the case where the frequency converter system is used to control the speed of an A-C motor, the oscillator 134 may be a variable frequency oscillator.

The current limit circuit 40 performs its dual function of periodically causing the voltage regulator circuit 140 to become a current regulator circuit and drastically reducing the output of the oscillator 134 when the current flow through the lines 1, 2 and 3 increases excessively. The transformers 41 couple voltage from the lines 1, 2 and 3 to the bridge rectifier 108. The rectified voltage is then coupled through the potentiometer 110 and across the cathode-gate electrode 114 and the anode of the diode 128. When a high current flows through the lines 1, 2 and 3, either due to a commutation failure in the frequency converter system or due to a short circuit in the load of the frequency system, the voltage at the gate electrode 114 becomes greater than the Zener voltage level of the Zener diode 128. This greater voltage causes the SCS 116 to conduct.

When the SCS 116 first begins to conduct a transient current flows through the capacitor 132, momentarily clamping the output 133 of the oscillator 134 to an output level near ground. This drastically reduces the voltage level of the reference voltage so that if a commutation failure has occurred in any of the converter circuits 18, 20 and 22, the modulators cannot fire the controlled rectifiers therein due to the low value of the reference voltage. This gives the controlled rectifiers a chance to stop conducting when they become reverse biased by the line-to-line voltage. The capacitor 132 quickly charges up after a few cycles of the voltage from the generator 4 so that the oscillator 134 can maintain its normal output voltage.

After the SCS 116 has fired, the cathode electrode 118, the cathode-gate electrode 114, and the anode-gate electrode 122 act as an NPN transistor to change the voltage regulator circuit 140 to its current regulation mode of operating. Therefore, while the oscillator 134 is recovering to supply its normal output voltage, the positive potential maintained by the capacitor 160 at the terminal 156 is discharged through the resistor 158, the anode-gate electrode 122, the cathode 118, and the resistor 126. As a result the transistor 150 is biased toward cut-off so that the voltage at its emitter is below the Zener voltage level of the Zener diode 166. That is, a higher impedance now appears between the collector and emitter electrodes of the transistor 150. In accordance with voltage divider theory, this allows a smaller portion of the positive potential from the source at the junction of the resistors 152 and 154 to appear at the emitter electrode of the transistor 150. Consequently, a voltage below the Zener voltage level of the Zener diode 166 appears across with reference terminals 168 and 170.

The three voltage regulators in the voltage regulator circuit 140 compare this lesser voltage across the terminals 168 and 170 with the feedback voltage conducting from the output phases A, B and C through the lines 34, 36 and 38. When the three regulator circuits compare this lesser voltage with the normal feedback signals, a larger error signal results than would occur under normal conditions. Therefore, the signals through the lines 144, 146 and 148 cause the clipper 138 to reduce the magnitude of the reference voltage. The controlled rectifiers fire later in the cycles of their line-to-line voltage as a result. Therefore, a lesser amount of power is drawn from the generator 4, allowing the converters 18, 20 and 22 to gradually recover from a commutation failure which causes the high current to flow through the lines 1, 2 and 3.

As the current flow through the lines 1, 2 and 3 decreases, the SCS 116 looses its control over the conduction of the transistor 150. At this time the current flow through the lines 1, 2 and 3 decreases so that a lesser voltage is applied through the bridge rectifier 108 and the potentiometer 110 to the gate electrode 114. A lesser current is drawn from the terminal 156 by the SCS 116, allowing the capacitor 160 to charge to a higher voltage level. The transistor 160 begins to conduct more heavily and a larger voltage appears at its emitter electrode. Eventually, when the current through the lines 1, 2 and 3 returns to its normal level, the SCS 116 turns off, and the transistor 150 is turned on once again. At this time the voltage across the Zener diode 166 reaches the Zener voltage level once again. Therefore, the three voltage regulator circuits in the voltage regulator circuit 140 return to their voltage regulation mode of operating.

From the above analysis it can be appreciated that the current limit circuit 40 allows the converter circuits 18, 20, and 22 to recover from commutation failures, even though these failures do not cause high output currents at the load which can be detected by feedback through the lines 34, 36 and 38. However, the capacitor 160 performs another function which prevents commutation failure when the frequency converter system is first started up. Under normal operating conditions there is no feedback voltage from the output phases A, B and C when the frequency converter is starting up. With the normal resistor in place of the capacitor 160, the voltage regulators compare the absence of feedback voltage with the Zener voltage across the reference terminals 168 and 170 and detect a large "error." This "error" is corrected by having the controlled rectifiers in the converters 18, 20 and 22 deliver more power to the load. To accomplish this the regulators provide signals through the lines 144, 146 and 148 to increase the size of the reference voltage coming out of the clipper circuit 138, thereby causing the controlled rectifiers to fire earlier in the cycle of the line-to-line voltage. This high increase in the reference voltage at the start up of the frequency converter circuit tends to fire the rectifiers out of their normal firing sequence, causing commutation failure.

Adding the capacitor 160 to the voltage regulator circuit 140 causes a gradual increase in the magnitude of the reference voltage so that the controlled rectifiers in the converter circuits 18, 20 and 22 are fired in their proper sequence. When the frequency converter circuit is started up, either at the beginning of its operation or after a temporary shut down, the voltage across the capacitor 160 is zero. Therefore, the base and emitter electrodes of the transistor 150 are biased with zero voltage. The impedance between the collector and emitter electrodes of the transistor 150 is high, blocking the voltage of the positive source voltage from the emitter electrode. The capacitor 160 is charged by the positive voltage source through the resistor 154. The voltage across this capacitor increases slowly to gradually forward bias the base and emitter electrodes of the transistor 150. This gradually decreases the impedance between the collector and emitter electrodes of the transister 150 which causes an increasing, ramp-like voltage to appear at the emitter electrode. When the individual voltage regulators compare this increasing ramp-like voltage across the reference terminals 168 and 170 with the feedback voltage from the lines 34, 36 and 38, they produce signals through the lines 144, 146 and 148 which gradually increase the magnitude of the reference voltage. The controlled rectifiers in the converter circuits 18, 20 and 22 are gradually fired earlier in the cycle of the line-to-line voltage, decreasing the chance of commutation failure. Eventually the voltage at the emitter electrode reaches the Zener voltage level of the Zener diode 166 and it remains at this level across the reference terminals 168 and 170 during the normal operation of the frequency converter system.

Figure 5:
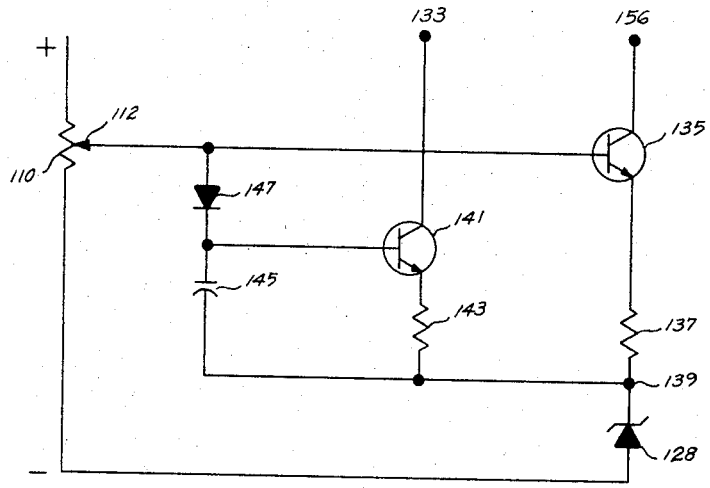
FIGURE 5 shows a modification of the current limiting circuit shown in FIGURE 4.

FIGURE 5 is a schematic diagram of a current limit circuit which may be substituted for the current limit circuit 40 shown in FIGURE 4. Common circuit components and junction points in FIGURES 4 and 5 are marked with similar numerals. As described above, each time the current limit circuit shown in FIGURE 4 operates the SCS 116 both clamps the output of the oscillator 134 to the zero output level and causes the voltage regulators in the voltage regulator circuit 140 to become current regulators. It has been found that some conditions which cause a higher current flow from the power source, as where a moderate overload occurs as opposed to a commutation failure, it is desirable to convert the voltage regulators to current regulators without clamping the output of the oscillator 134. The circuit shown in FIGURE 5 is particularly advantageous where the load current has increased to the point where the current limiting circuit 40 begins to function. For this current range the frequency converter system functions properly without clamping the output of the reference oscillator if the current limit circuit 40 smoothly transfers into its current limiting mode of operation.

In the circuit shown in FIGURE 5, an NPN transistor 135 operates in a manner similar to the operation of the cathode electrode, the cathode-gate electrode, and the anode-gate electrode of the SCS 116 to convert the voltage regulators to current regulators. The slide wire 112 is coupled to the base electrode of a transistor 135. The collector electrode of the transistor 135 is connected to the junction point 156, while the emitter electrode is coupled through the resistor 137 to a junction point 139 at the cathode electrode of the Zener diode 128.

A second transistor circuit provides controlled clamping of the output line 133. In this circuit the emitter eletrode of a transistor 141 is coupled through a resistor 143 to the junction point 139. A capacitor 145 connected between the base electrode of the transistor 141 and the junction point 139 may be charged through a diode 147 connected to the slide wire 112.

When a moderate overload of the frequency converter system occurs, the voltage at the base electrode of the transistor 135 becomes greater than the Zener breakdown voltage level of the Zener diode 128. Therefore, current can flow through the base and emitter circuit of the transistor 135 to turn on this transistor. The NPN transistor 135 discharges the capacitor 160 through the terminal 156, thereby causing the voltage regulators in the voltage regulator circuit 140 to operate in their current regulating mode, as explained above with respect to the circuit shown in FIGURE 4.

While the transistor 135 is conducting due to a moderate overload of the frequency converter system, the voltage drop across the resistor 137 does not exceed the forward voltage drop of the diode 147. Unless this forward voltage drop is exceeded, the capacitor 145 cannot be charged to turn on the transistor 141.

However, when the commutation failure occurs a much larger voltage is applied through the slide wire 112 and the base and emitter circuits of the transistor 135 to the resistor 137. Therefore, the voltage across this resistor 137 exceeds the forward drop of the diode 147. At this time the capacitor 145 can begin to charge, turning on the transistor 141. Since the resistor 143 has a small impedance with respect to that of the resistor 137, a large current is drawn from the output line 133 to clamp the output of the oscillator 134. The charge on the capacitor 145 causes the transistor 141 to clamp the output line 133 for a short interval during which the commutation failure may clear and the controlled rectifiers may cool off. Therefore, when the larger voltage is applied to the slide wire 112, as when a commutation failure causes an inordinate current flow from the power source 4, the circuit shown in FIGURE 5 both changes the voltage regulators to current regulators and clamps the output of the oscillator 134.

FIGURE 6 is a schematic diagram of two types of load and filter circuits which are used with a double-way type of rectifier connection in each converter circuit. FIGURE 6(a) shows a prior art circuit in which a number of inductors in the filter enhanced commutation failure. FIGURE 6(b) shows a modified filter circuit which corrects the undersirable features of the prior art circuit shown in FIGURE 6(a).

Referring to the circuit shown in FIGURE 6(a), the controlled rectifiers are numbered in the same manner as are those shown in FIGURES 1 and 3. However, in the double-way circuit the current flows through one rectifier, through the load, and through another rectifier on the other side of the load. Therefore, there are twice the number of controller rectifiers to perform the same function. The controlled rectifiers on the left side of the load are referred to as the number one bank of controlled rectifiers and are numbered A1P1, A2P1, A3P1, A1N1, etc.; these are divided up into the P1 and N1 sets of controlled rectifiers. The controlled rectifiers on the right side of the load are said to be in the number two bank and are numbered accordingly A1P2, A2P2, A3P2, A1N2, etc.; these are divided up into the P1 and N1 sets of controlled rectifiers. The numbers 1, 2, and 3 at one end of the controlled rectifiers signify the input phase line to which each is connected.

The P1 set of controlled rectifiers in the upper left of FIGURE 6(a) are connected through an inductor 172, a terminal 174, and an inductor 176 to the N1 set of controlled rectifiers. The P2 set of controlled rectifiers are connected through an inductor 178, a terminal 180, and an inductor 182 to the N2 set of controlled rectifiers. These four inductors are part of a filter circuit which also includes a capacitor 184 connected across the terminals 174 and 180 and a pair of capacitors 186 and 188 connected between the terminals 174 and neutral and between the terminals 180 and neutral, respectively. A load 190 is connected across the terminals 174 and 180.

A current path exists between the P1 and N1 sets of controlled rectifiers in the number one bank and between the P2 and N2 sets of controlled rectifiers in the number two bank. Since the inductors connected between each set of rectifiers and the terminals 174 and 180 offer a relatively small impedance to the lower frequency output current, a circulating current marked in the diagram can flow between the controlled rectifiers in each bank without passing through the load.

FIGURE 7 is referred to with respect to the operation of the circuit shown in FIGURE 6(a). FIGURE 7(a) shows the shape of a half cycle of output current, say flowing between the P1 rectifiers and the N2 rectifiers. In FIGURE 7(b) the solid line voltage diagram shows a voltage wave which is induced in each of the filter inductors as the output current is supplied to the load 190. The dotted line voltage diagram shown in FIGURE 7(b) is used to explain the operation of the circuit shown in FIGURE 6(b).

The P1 and N2 sets of rectifiers build up a current flow in one direction through the load 190. Therefore, when the line-to-line voltages across the lines 1, 2 and 3 forward bias various pairs of rectifiers, one in each of the P1 and N2 banks, modulator circuits program the firing of these rectifiers to build up a lower frequency output from the higher frequency input as explained above. During the half cycle of the output current shown in FIGURE 7(a), current flows from the P1 set of controlled rectifiers and through the inductor 172, the terminal 174, and load 190, the terminal 180, and the inductor 182 to the N2 set of controlled rectifiers. At the same time circulating current flows from the P1 set of controlled rectifiers, through the inductor 172, the terminal 174, and the inductor 176 to the N1 set of controlled rectifiers. Circulating current also flows from the P2 set of controlled rectifiers through the inductor 178 and terminal 180, and the inductor 182 to the N2 set of controlled rectifiers.

During the first quarter cycle of the output current when the current is building up in the inductors 172 and 176, the voltage induced in the inductors is positive in polarity at the P1 controlled recitifier side of the inductor 172 and is positive in polarity at the load side of the inductor 176. This voltage tends to inhibit the flow of circulating current through these inductors. During the second quarter cycle of the output current in FIGURE 7(a) the magnitude of the output current is decreasing. The voltage induced in th inductors 172 and 176 is such as to oppose this decrease in output current. Therefore, the voltage induced in the inductor 172 is positive in polarity at its load side, and the voltage induced in the inductor 176 is positive at the side nearest the N1 controlled rectifiers. The voltages induced in these inductors at this time tend to increase the circulating current between the P1 and N1 sets of rectifiers. Similarly, the voltages induced in the inductors 178 and 182 tend to increase circulating current during the second quarter of the load current.

The chances of commutation failure occurring in the frequency converter system of thhe type shown in FIGURE 6(a) are increased at the end of a half cycle of the output current when the current is transferred from the P1 and N2 sets of controlled rectifiers to the N1 and P2 sets of controlled rectifiers. It will be recalled that during a commutation failure current continues to flow through controlled rectifiers which should be nonconducting. The fact that the voltage induced in the inductors 172, 176, 178 and 182 at the end of a half cycle of the output current enhances the flow of circulating current through the P1 and N2 sets of controlled rectifiers and makes it more difficult for them to turn off. Therefore, the voltage induced in these inductors tends to cause a commutation failure in the P1 and N2 sets of controlled rectifiers.

During a succeeding half cycle of the output current the current flow from the P2 set of controlled rectifiers to the N1 set of controlled rectifiers causes a circulating current to flow through the inductors 172, 176, 178 and 182. Near the end of that half cycle of the output current a positive voltage is induced at the load end of the inductors 172 and 178 and the end of the inductor 182 adjacent the N2 set of controlled rectifiers and the end of the inductor 176 adjacent the N1 set of controlled rectifiers. These voltages enhance the flow of circulating current between the P1 and N1 sets of controlled rectifiers and between the P2 and N2 sets of rectifiers. This induced voltage tends to cause a commutation failure as the current transfers from the P2 and N1 sets of controlled rectifiers to the P1 and N2 sets of controlled rectifiers again.

The circuit shown in FIGURE 6(b) uses a pair of transformers to minimize the chance of commutation failure. Common circuit components in both FIGURES 6(a) and 6(b) are marked with similar numbers. A winding 192 of a transformer 194 is connected between the P1 set of rectifiers and the terminal 174. The winding 192 is magnetically coupled to a winding 196 connected between the P2 set of rectifiers and the terminal 180. In a transformer 198, a winding 200 is connected between the N1 bank of rectifiers and the terminal 174. The winding 200 is magnetically coupled to the winding 202 connected between the N2 set of rectifiers and the terminal 180.

During the positive half cycle of the output current shown in FIGURE 7, the current flows from the P1 set of rectifiers, through the winding 192, the terminal 174, the load 190, the terminal 180, and the winding 202 to the N2 set of rectifiers. During the first quarter cycle of the output current shown in FIGURE 7(a), the output current induces a positive voltage at the dot end of the winding 192 and a positive voltage at the dot end of the winding 202. While the circulating current tends to induce a positive voltage at the no-dot end of the windings 196 and 200, the heavier load current flowing through the windings 192 and 202 induces a voltage of positive polarity at the dot end of the windings 196 and 200. Along the circulated current path between the P1 and N1 sets of controlled rectifiers and the P2 and N2 sets of controlled rectifiers the voltages induced in the windings 192 and 200 and in the windings 196 and 202 tend to cancel out each other so that they neither aid nor oppose the circulating current. The dotted line voltage wave diagram shows the induced secondary voltage in the windings 196 and 200. The polarity of this voltage is opposite to that at the windings 192 and 202.

During the next quarter cycle of the output current shown in FIGURE 7(a) the output current is decreasing in magnitude. Therefore, the voltage induced in the windings 192 and 202 acts as a current generator. A voltage of positive polarity at the no-dot ends is induced in the windings 192 and 202. A voltage of positive polarity is also induced at the no-dot end of the windings 196 and 200. In the circulating current path between the P1 and N1 sets of controlled rectifiers and the P2 and N2 sets of controlled rectifiers the voltages induced in the windings 192 and 200 and the windings 196 and 202 once again tend to cancel each other. Therefore, there is no induced voltage tending to aid the flow of circulating current at the end of a half cycle of the output current. For this reason the circuit shown in FIGURE 6(b) is less likely to suffer a commutation failure at the end of a half cycle of the output current than is the circuit shown in FIGURE 6(a).

During a succeeding half cycle of the load current, when it flows from the P2 set of controlled rectifiers, the winding 196, the terminal 180, the load 190, the terminal 174, and the winding 200 to the N1 set of controlled rectifiers, a similar analysis can be applied to the effects of the transformers 194 and 198 on the flow of circulating current between the P1 and N1 sets of controlled rectifiers and between the P2 and N2 sets of controlled rectifiers. Thus, during the half cycle of the output current the load current flowing through the windings 196 and 200 induces a secondary voltage in the windings 192 and 202 which opposes that voltage induced in the windings 196 and 200. Therefore, these voltages have no affect on the flow of circulating current.

This invention is not limited to the particular details of the embodiment illustrated, and it is contemplated that various modifications and applications thereof will occur to those skilled in the art. It is therefore intended that the appended claims cover such modifications and applications as do not depart from the direct spirit and scope of this invention.

What I claim as new and desire to secure by Letters Patent of the United States is:

1. A frequency conversion system for use with an alternating current power source comprising frequency conversion means for each of a desired number of output phases, each frequency conversion means including a number of power switching devices responsive to the output of said power source and rendered conductive when forward biased by the output of said power source and upon the application of switching signals thereto, a reference frequency source having a number of output phases corresponding to said desired number, a corresponding desired number of modulating means, each modulating means being coupled to the output of the power source and an output phase of said reference frequency source for mixing the power source output voltage with the reference signal, modulating circuit means in each of said modulating means for effecting a switching signal for each power switching device in the associated frequency conversion means, means responsive to the power source output voltage for interrupting operating power supplied to said modulating circuit means whenever the corresponding power switching device is reverse biased, and combining means for respectively combining the outputs of said power switching devices in each frequency conversion means to provide the desired number of output phases having the frequency of said reference frequency source.

2. A circuit according to claim 1 wherein said means for interrupting operating power includes a switching circuit connected between an operating power supply and each modulating circuit means and further comprises circuit means for coupling a voltage in phase with each of said power switching devices to said switching circuit connected between the operating power supply and the modulating circuit means corresponding to said power switching device.

3. A circuit according to claim 1 which also includes first circuit means responsive to the current flow from a power source for regulating the output voltage of said frequency conversion means in response to a predetermined change in the current flow from the power source, and second circuit means responsive to the current flow from the power source for momentarily decreasing the output of said frequency conversion means in response to an inordinate change in the current flow from the power source.

4. A circuit according to claim 3 wherein said first and second circuit means both include a silicon controlled switch.

5. A circuit according to claim 3 wherein said first circuit means comprises a first amplifier circuit and said second circuit means comprises a second amplifier circuit, and further including means interconnecting said first and second amplifier circuits to cause said first amplifier circuit to operate in response to a smaller change in the current flow from the power source than does the second amplifier circuit.

6. A circuit according to claim 1 wherein said reference frequency source comprises an oscillator circuit means for generating a reference signal for each of the desired number of output phases and a reference voltage regulator circuit including first circuit means connected to said regulator circuit and responsive to the current flow from the power source for regulating the output of said reference frequency source in response to changes in the power source current flow when the current is above a predetermined level, and second circuit means connected to said oscillator means and responsive to the current flow from the power source for momentarily decreasing the output of said oscillator means in response to an inordinate increase in the current flow from the power source.

7. A circuit according to claim 6 wherein said first circuit means is connected to a source of normally constant voltage for said regulator circuit to cause this source to vary the normally constant voltage after the predetermined level has been attained.

8. A circuit according to claim 6 wherein said first and second circuit means both include a silicon controlled switch.

9. A circuit according to claim 6 wherein said first circuit means comprises a first amplifier circuit and said second circuit means comprises a second amplifier circuit, and further including means interconnecting said first and second amplifier circuits to cause said first amplifier circuit to operate in response to a smaller change in the current flow from the power source than does the second amplifier circuit.

10. A circuit according to claim 1 wherein said switching devices comprise first and second groups of controlled rectifiers, said first group of controlled rectifiers being forward biased by the output of said power source of one polarity, said second group of controlled rectifiers being forward biased by the output of said power source of the opposite polarity, said frequency conversion means further includes third and fourth groups of controlled rectifiers, said third group of controlled rectifiers being forward biased by the output of said power source of one polarity, said fourth group of controlled rectifiers being forward biased by the output of said power source of the opposite polarity, said combining means comprising a plurality of transformers, each of said transformers including a plurality of inductors, means for connecting an inductor of each of said transformers in circuit with the first and second groups of controlled rectifiers, and means for connecting a second inductor of each of said transformers in circuit with the third and fourth groups of controlled rectifiers to cause said transformers to neutralize the effects of voltage induced in said inductors by current which circulates through said first and second groups of controlled rectifiers and through said third and fourth groups of controlled rectifiers without flowing through said output phases.

11. A circuit according to claim 1 including a regulating circuit means in circuit with said frequency conversion means, said regulating circuit means comprising reference voltage means and means for gradually increasing the magnitude of the reference signal to its steady state value after an interruption in the power supplied by the power source.

12. A circuit according to claim 1 wherein said reference frequency source includes a regulating circuit, reference voltage means in said regulating circuit for normally providing a constant reference signal, and capacitive circuit means connected in said reference voltage means for gradually increasing the magnitude of the reference signal to its normally constant value after an interruption in the power supplied by the power source.

13. A circuit according to claim 1 including means interconnecting the power source outputs and said combining means for causing current from said combining means to flow through a load device in more than one direction, said combining means comprising inductor filter means, means interconnecting pairs of inductors in said filter means for neutralizing the effects of voltage induced in said inductors by current which circulates through said power switching devices without flowing through said output phases to the load.

14. A circuit according to claim 13 including means for magnetically coupling the inductors in each of said pairs of inductors.

15. A frequency conversion system for use with an alternating current power source comprising frequency conversion means for each of a desired number of output phases, each frequency conversion means including a number of power switching devices responsive to the output of said power source and rendered conductive when forward biased by the output of said power source and upon the application of switching signals thereto, a reference frequency source having a number of output phases corresponding to said desired number, a corresponding desired number of modulating means, each modulating means being coupled to the output of the power source and an output phase of said reference frequency source for mixing the power source output voltage with the reference signal, modulating circuit means in each modulating means for effecting a switching signal for each power switching device in the associated frequency conversion means, first circuit means responsive to the current flow from the power source for regulating the output voltage of said frequency conversion means in response to a predetermined change in the current flow from the power source, second circuit means responsive to the current flow from the power source for momentarily decreasing the output of said frequency conversion means in response to an inordinate change in the current flow from the power source, and combining means for respectively combining the outputs of said power switching devices in each frequency conversion means to provide the desired number of output phases having the frequency of said reference frequency source.

16. A circuit according to claim 15 wherein said switching devices comprise first and second groups of controlled rectifiers, said first group of controlled rectifiers being forward biased by the output of said power source of one polarity, said second group of controlled rectifiers being forward biased by the output of said power source of the opposite polarity, said frequency conversion means further includes third and fourth groups of controlled rectifiers, said third group of controlled rectifiers being forward biased by the output of said power source of one polarity, said fourth group of controlled rectifiers being forward biased by the output of said power source of the opposite polarity, and wherein each combining means comprises a plurality of transformers, each of said transformers including a plurality of inductors, means for connecting an inductor of each of said transformers in circuit with the first and second groups of controlled rectifiers, and means for connecting a second inductor of each of said transformers in circuit with the third and fourth groups of controlled rectifiers to cause said transformers to neutralize the effects of voltage induced in said inductors by current which circulates through said first and second groups of controlled rectifiers and through said third and fourth groups of controlled rectifiers without flowing through said output phases.

17. A circuit according to claim 15 wherein said first and second circuit means both include a silicon controlled switch.

18. A circuit according to claim 15 wherein said first circuit means comprises a first amplifier circuit and said second circuit means comprises a second amplifier circuit, and further includes means interconnecting said first and second amplifier circuits to cause said first amplifier circuit to operate in response to a smaller change in the current flow from the power source than does the second amplifier circuit.

19. A circuit according to claim 15 wherein said reference frequency source comprises an oscillator circuit means for generating a reference signal for each of the desired number of output phases and a reference voltage regulator circuit including means for interconnecting said first circuit means and said regulator circuit for regulating the output of said reference frequency source in response to changes in the power source current flow when the current is above a predetermined level, and means interconnecting said second circuit means and said oscillator means for momentarily decreasing the output of said oscillator means in response to an inordinate increase in the current flow from the power source.

20. A circuit according to claim 19 wherein said first circuit means is connected to a source of normally constant voltage for said regulator circuit to cause this source to vary the normally constant voltage after the predetermined current level has been attained.

21. A circuit according to claim 19 wherein said first and second circuit means both include a silicon controlled switch.

22. A circuit according to claim 19 wherein said first circuit means comprises a first amplifier circuit and said second circuit means comprises a second amplifier circuit, and further includes means interconnecting said first and second amplifier circuits to cause said first amplifier circuit to operate in response to a smaller change in the current flow from the power source than does said second amplifier circuit.

23. A circuit according to claim 15 including a regulating circuit means in circuit with said frequency conversion means, said regulating circuit means comprising reference voltage means and means for gradually increasing the magnitude of the reference signal to its steady state value after an interruption in the power supplied by the power source.

24. A circuit according to claim 15 wherein said reference frequency source includes a regulating circuit, reference voltage means in said regulating circuit for normally providing a constant reference signal, and capacitive circuit means connected in said reference voltage means for gradually increasing the magnitude of the reference signal to its normally constant value after an interruption in the power supplied by the power source.

25. A circuit according to claim 15 including means interconnecting the power source outputs and said combining means for causing current from said combining means to flow through a load device in more than one direction, said combining means comprising inductor filter means, and means interconnecting pairs of inductors in said filter means for neutralizing the effects of voltage induced in said inductors by current which circulates through said power switching devices without flowing through said output phases to the load.

26. A circuit according to claim 25 including means for magnetically coupling the inductors in each of said pairs of inductors.

27. A frequency conversion system for use with an alternating current power source comprising frequency conversion means for each of a desired number of output phases, each frequency conversion means including a number of power switching devices responsive to the output of said power source and rendered conductive when forward biased by the output of said power source and upon the application of switching signals thereto, a reference frequency source having a number of output phases corresponding to said desired number, the frequency of the reference frequency source being less than the frequency of the output voltage from the power source, means in said reference frequency source for causing the magnitude of the reference signal to gradually increase to a steady state value after an interruption in the power supplied by the power source, a corresponding desired number of modulating means, each modulating means being coupleed to the output of the power source and an output phase of said reference frequency source for mixing the power source output voltage with the reference signal, modulating circuit means in each modulating means for effecting a switching signal for each power switching device in the associated frequency conversion means, and combining means for respectively combining the outputs of said power switching devices in each frequency conversion means to provide the desired number of output phases having the frequency of said reference frequency source.

28. A circuit according to claim 27 wherein said switching devices comprise first and second groups of controlled rectifiers, said first group of controlled rectifiers being forward biased by the output of said power source of one polarity, said second group of controlled rectifiers being forward biased by the output of said power source of the opposite polarity, said frequency conversion means further includes third and fourth groups of controlled rectifiers, said third group of controlled rectifiers being forward biased by the output of said power source of one polarity, said fourth group of controlled rectifiers being forward biased by the output of said power source of the opposite polarity, and wherein each combining means comprises a plurality of transformers, each of said transformers including a plurality of inductors, means for connecting an inductor of each of said transformers in circuit with the first and second groups of controlled rectifiers, and means for connecting a second inductor of each of said transformers in circuit with the third and fourth groups of controlled rectifiers to cause said transformers to neutralize the effects of voltage induced in said inductors by current which circulates through said first and second groups of controlled rectifiers and through said third and fourth groups of controlled rectifiers without flowing through said output phases.

29. A circuit according to claim 27 wherein said reference frequency source includes a regulating circuit, reference voltage means in said regulating circuit for normally providing a constant reference signal, said reference voltage means including said means for gradually increasing the magnitude of the reference signal to its normally constant value after an interruption in the power supplied by the power source, said last-named means being capacitive means.

30. A circuit according to claim 27 including means interconnecting the power source outputs and said combining means for causing current from said combining means to flow through a load device in more than one direction, said combining means comprising inductor filter means, and means interconnecting pairs of inductors in said filter means for neutralizing the effects of voltage induced in said inductors by current which circulates through said power switching devices without flowing through said output phases to the load.

31. A circuit according to claim 30 including means for magnetically coupling the inductors in each of said pairs of inductors.

32. A frequency conversion system for use with an alternating current power source comprising frequency conversion means for each of a desired number of output phases, each frequency conversion means including a number of power switching devices responsive to the output of said power source and rendered conductive when forward biased by the output of said power source and upon the application of switching signals thereto, a reference frequency source having a number of output phases corresponding to said desired number, the frequency of the reference frequency source being less than the frequency of the output voltage from the power source, a corresponding desired number of modulating means, each modulating means being coupled to the output of the power source and an output phase of said reference frequency source for mixing the power source output voltage with the reference signal, modulating circuit means in each modulating means for effecting a switching signal for each power switching device in the associated frequency conversion means, combining means for respectively combining the outputs of said power switching devices in each frequency conversion means to provide the desired number of output phases having the frequency of said reference frequency source, means interconnecting the power source outputs and said combining means for causing current from said combining means to flow through a load device in more than one direction, said combining means comprising inductor filter means and means interconnecting pairs of inductors in said filter means for neutralizing the effects of voltage induced in said inductors by current which circulates through said power switching devices without flowing through said output phases to the load.

33. A circuit according to claim 32 including means for magnetically coupling the inductors in each of said pairs of inductors.

34. A frequency conversion system for use with an alternating current power source comprising frequency conversion means for each of a desired number of output phases, each of said frequency conversion means including first and second groups of controlled rectifiers, said first group of controlled rectifiers being forward biased by the output of said power source of one polarity, said second group of controlled rectifiers being forward biased by the output of said power source of the opposite polarity, said controlled rectifiers being rendered conductive when forward biased by the output of said power source and upon the application of switching signals thereto, a reference frequency source having a number of output phases corresponding to said desired number, the frequency of the reference frequency source being less than the frequency of the output voltage from the power source, a corresponding desired number of modulating means, each modulating means being coupled to the output of the power source and an output phase of said reference frequency source for mixing the power source output voltage with the reference signal, modulating circuit means in each modulating means for effecting a switching signal for each controlled rectifier in the associated frequency conversion means, combining means for respectively combining the outputs of said controlled rectifiers in each frequency conversion means to provide the desired number of output phases having the frequency of said reference frequency source, said frequency conversion means further including third and fourth groups of controlled rectifiers, said third group of controlled rectifiers being forward biased by the output of said power source of one polarity, said fourth group of controlled rectifiers being forward biased by the output of said power source of the opposite polarity, said combining means comprising a plurality of transformers, each of said transformers including a plurality of inductors, means for connecting an inductor of each of said transformers in circuit with the first and second groups of controlled rectifiers, and means for connecting a second inductor of each of said transformers in circuit with the third and fourth groups of controlled rectifiers to cause said transformers to neutralize the effects of voltage induced in said inductors by current which circulates through said first and second groups of controlled rectifiers and through said third and fourth groups of controlled rectifiers without flowing through said output phases.

References Cited

UNITED STATES PATENTS

| | | | |
|---|---|---|---|
| 2,967,252 | 1/1961 | Blake | 321—61 X |
| 3,148,324 | 9/1964 | Peaslee et al. | 321—69 |
| 3,152,297 | 10/1964 | Peaslee | 321—61 |
| 3,256,244 | 6/1966 | Byloff et al. | 321—61 |
| 3,295,020 | 12/1966 | Borkovitz | 317—33 |

LEE T. HIX, *Primary Examiner.*

G. GOLDBERG, *Assistant Examiner.*